UNITED STATES PATENT OFFICE.

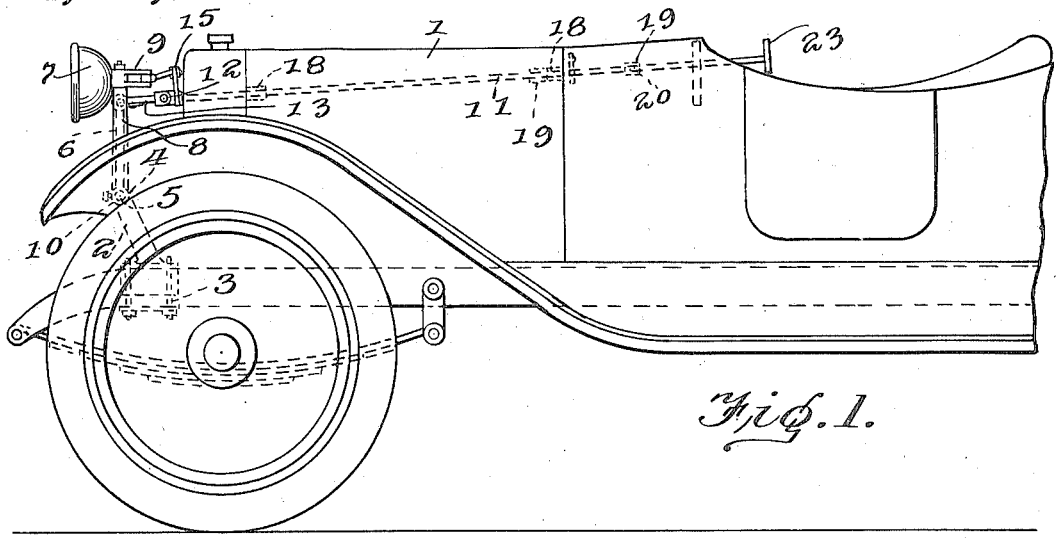
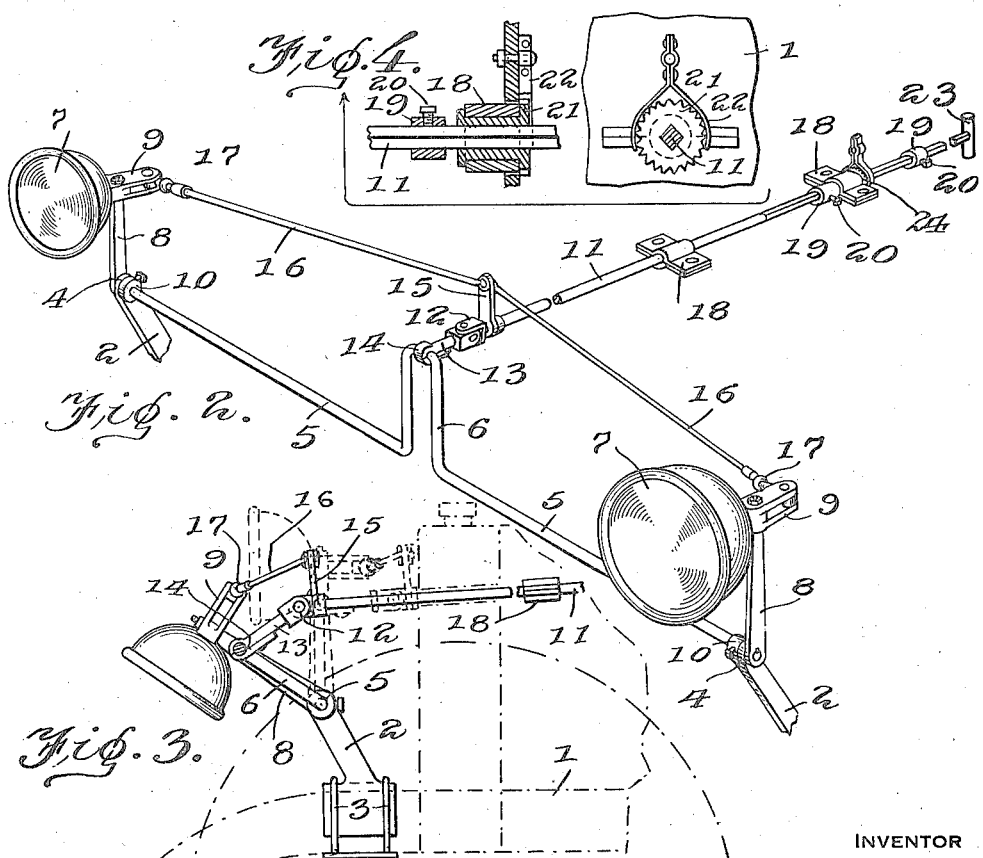
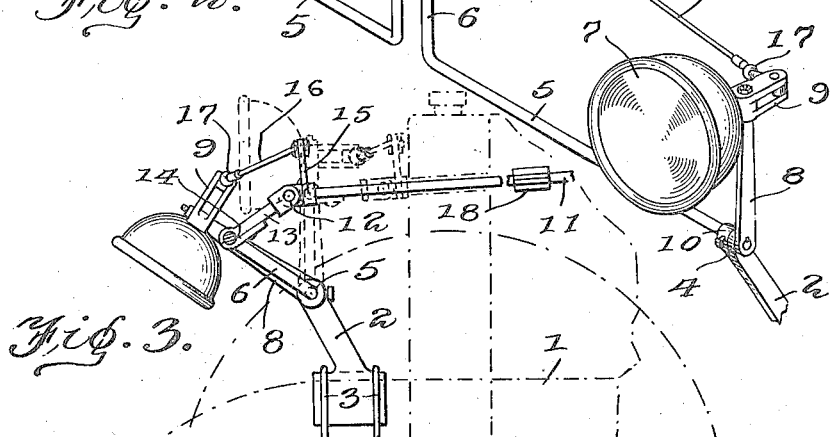

JOHN DOLAN, OF ELDRED, PENNSYLVANIA.

DIRIGIBLE HEADLIGHT.

1,263,750.	Specification of Letters Patent.	Patented Apr. 23, 1918.

Application filed August 8, 1917. Serial No. 185,205.

*To all whom it may concern:*

Be it known that I, JOHN DOLAN, a citizen of the United States, residing at Eldred, in the county of McKean and State of Pennsylvania, have invented new and useful Improvements in Dirigible Headlights, of which the following is a specification.

This invention relates to improvements in dirigible headlights for automobiles and other vehicles.

More particularly, the invention deals with a device of this character in which a single control element is adapted for linear movement to direct the headlights in a vertical plane and is adapted for rotative movement to direct the headlights laterally.

It is therefore the purpose of my present invention to provide a more efficient arrangement of the connecting links between the lamps and the control rod, and more effective arrangement of swinging joints for the length so that all strains on the mechanism will be prevented.

The simplification of the entire structure by which the cost of manufacture is reduced and the practical utility and durability of the mechanism is amplified constitutes another object of the invention.

Further objects will hereinafter appear, and the invention will be clearly understood, from the following specification taken in connection with the accompanying drawings. It is to be understood that only one of many possible forms of the invention is shown and described, and that the right is reserved to depart from the particular embodiment set forth within the scope indicated by the latitude of the claims.

In the drawings:—

Figure 1 is a fragmentary side elevation of an automobile equipped with the device comprised in the present invention.

Fig. 2 is a perspective view of the device as disassociated from the automobile.

Fig. 3 is a fragmentary side elevation showing portions of the mechanism in the downward position of the lamps.

Fig. 4 represents a longitudinal and transverse sectional details of the means for preventing accidental rotation of the control rod.

Referring to the drawings more specifically the numeral 1 designates an automobile of any ordinary type. Supporting brackets 2 are secured as by bolts 3 to convenient portions of the frame of the automobile and are here shown as projecting forwardly. The ends of the brackets 2 constitute bearings 4 in which is journaled a shaft 5 extending transversely of the car. The shaft 5 is bent intermediately of its ends, in the present instance, to form a crank 6. The crank 6 may obviously be replaced by a separately formed arm bolted or otherwise secured to the shaft. Headlights 7 are pivotally mounted on brackets 8, secured on the ends of the shaft 5 for lateral swinging movement. The headlights 7 may be similar in all respects to those in common use with the exceptions noted and each preferably has a rearward extension 9 of the casing, for a purpose which will hereinafter become evident. Suitable collars 10 are secured as by set screws on the shaft 5 and abut against the bearings 4 to prevent sliding movement of the shaft in the bearings.

A control rod 11 has one end located conveniently relative to the driver's seat, and the other end terminating in proximity to the crank 6. The last mentioned end of the control rod is connected by a universal joint 12 to one end of the stub shaft 13 the other end of which is connected by a vertical swinging joint 14 with the crank 6. A vertically disposed arm 15 is pinned or otherwise suitably secured to the rod 11 toward the joint 12. A pair of links 16 are pivoted to the end of the arm 15 remote from the rod 11 in any acceptable manner, but it is preferable to arrange the pivotal connections so that slight fore-and-aft swinging motion of the links 16 will be permitted. When desired the pivotal connections between the arm 15 and the link 16 may be replaced by ball and socket joint. The outer end of each link 16 is connected as by ball and socket joint 17 with a rear portion of the extensions 9 on the lamps 7. Suitable bearings 18 for permitting rotative and longitudinal sliding movement of the rod 11 are attached to convenient portions of the frame structure of the car for supporting the rod. Preferably one of the bearings 18 is arranged to be clamped upon the rod 11 to provide sufficient friction to maintain the rod in any position in which it may be placed. Stops 19 which may consist of collars secured as by set screws 20 to the rod 11 on each side of a bearing 18 are provided for limiting the sliding movement of the rod to a desired degree. For retaining the rod 11 at any desired point of its rotation, a disk 20 may be provided having suitably disposed projections 21 for engagement by a spring detent 22 secured in any convenient manner to suitable portions of the car structure. A handle 23 is pivoted on the rod 11 for convenient manual actuation by the driver.

In practice it will be seen that by rotation of the handle 23 the lamps may be directed laterally as desired, while by a longitudinal movement of the rod 11 produced by pushing or pulling the handle 23 vertical adjustment of the lamps is permitted. It will be noted by providing the stub shaft 13 with the vertical swinging connection to the shaft 5 and the rotative connection to the rod 11 the vertical direct movement of the lamps is accomplished without straining or bending any portion of the mechanism.

The form of the invention shown and described, is for various reasons considered preferable, but constitutes only one of many comprised within the skill and scope of the invention, and the right is reserved to all other embodiments falling within the spirit of the invention as indicated by the breadth of the claims.

What is claimed is:—

1. In a dirigible headlight mechanism, a rotatable crank shaft, a lamp pivotally supported on each end of the crank shaft, a control rod, guides for the control rod, a link connected to said control rod and swingingly connected to the crank of said crank shaft, an arm on said control rod, and a pair of links pivotally connected to said arm, each link having ball and socket connection with a respective lamp.

2. In a dirigible headlight mechanism, a shaft, a rotatable mounting for said shaft, a pair of lamps, a pivotal connection between each lamp and a respective end portion of said shaft, a crank on said shaft, a control rod, guides for said control rod, a link connected to said control rod and swingingly connected to said crank, an arm on said control rod, a pair of links, a pivotal connection between each link and said arm, and a ball and socket connection between each link and a respective lamp.

3. In a dirigible headlight mechanism, a rotatable crank-shaft, a lamp pivotally supported on lateral projections of such shaft, extensions from the lamps in rear of their pivotal mountings, and a single rod connected with the crank shaft and with said rearward lamp extensions to actuate either of such parts at will.

In testimony whereof I affix my signature.

JOHN DOLAN.